Nov. 12, 1957  C. W. WEIDENHAMER  2,812,578
DENTAL EDUCATIONAL DEVICE
Filed Dec. 15, 1955  4 Sheets-Sheet 1
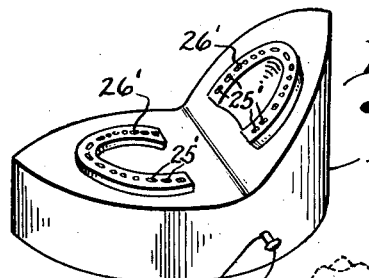
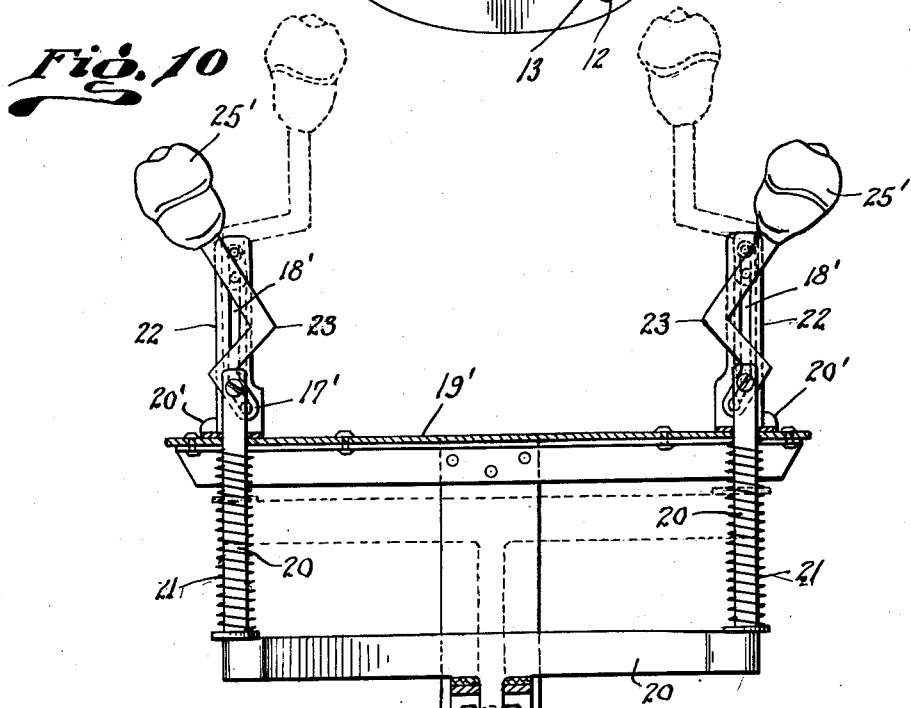
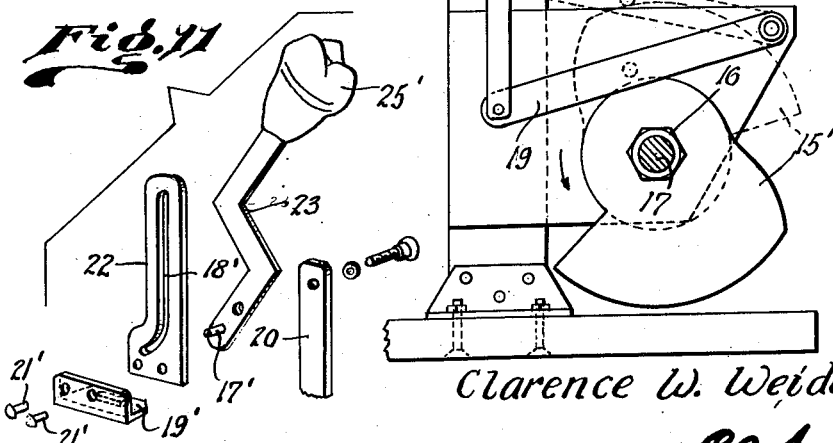
INVENTOR.
Clarence W. Weidenhamer
ATTORNEYS.

Nov. 12, 1957 C. W. WEIDENHAMER 2,812,578
DENTAL EDUCATIONAL DEVICE
Filed Dec. 15, 1955 4 Sheets-Sheet 2
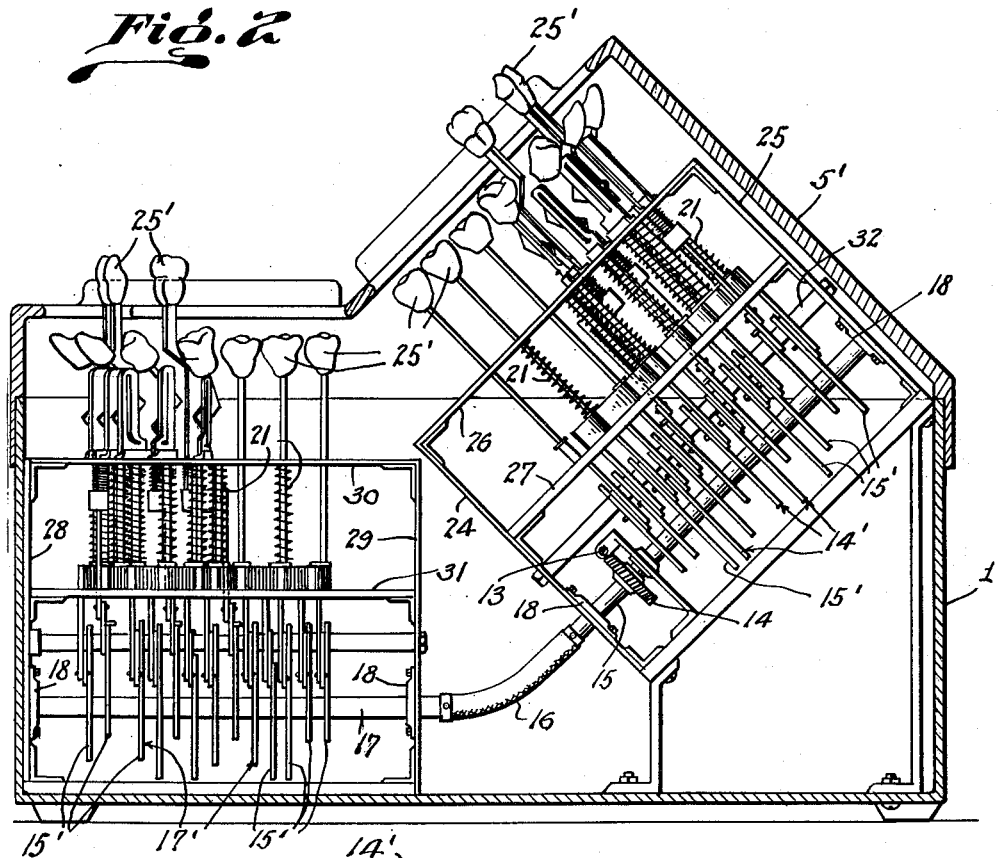
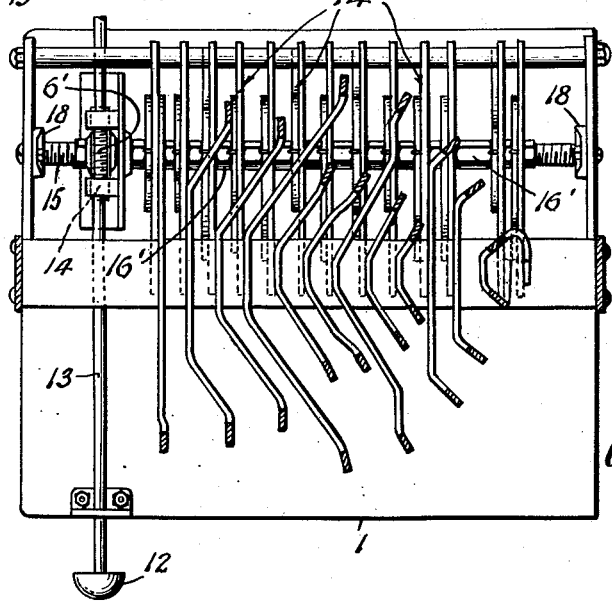
INVENTOR.
Clarence W. Weidenhamer
CA Snow & Co.
ATTORNEYS.

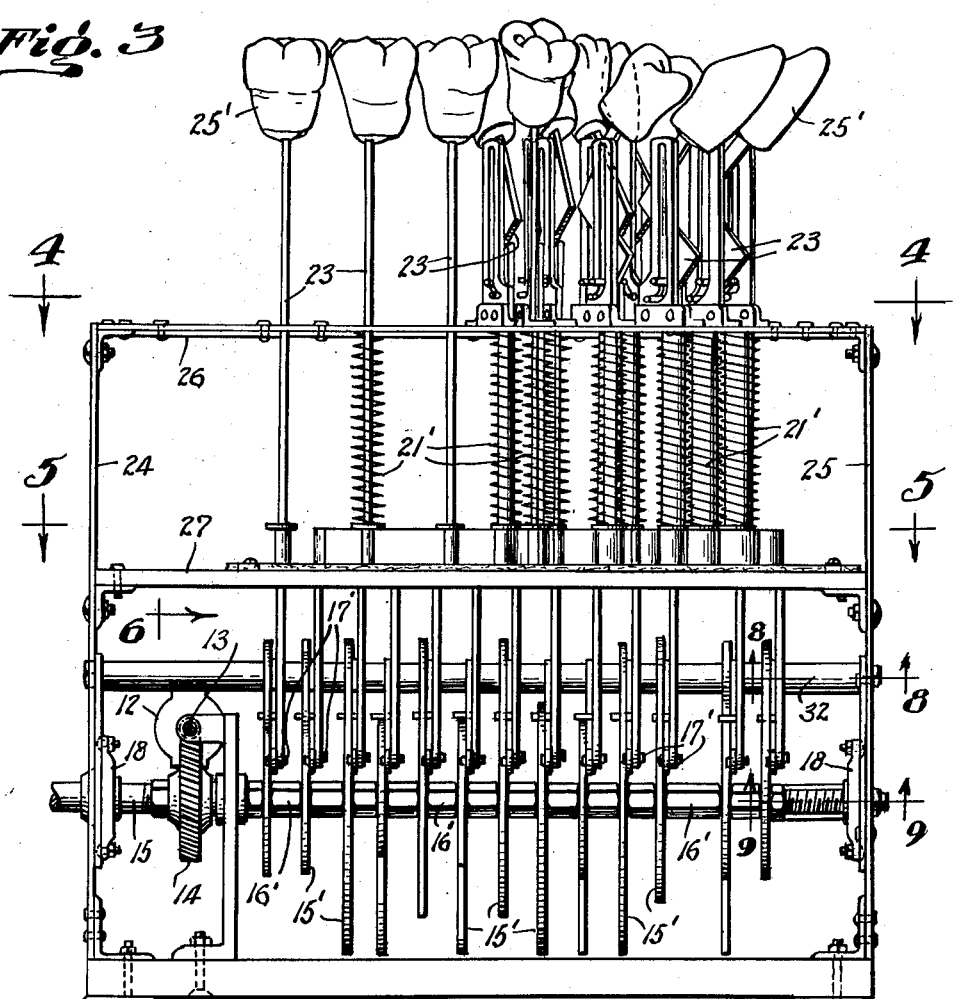

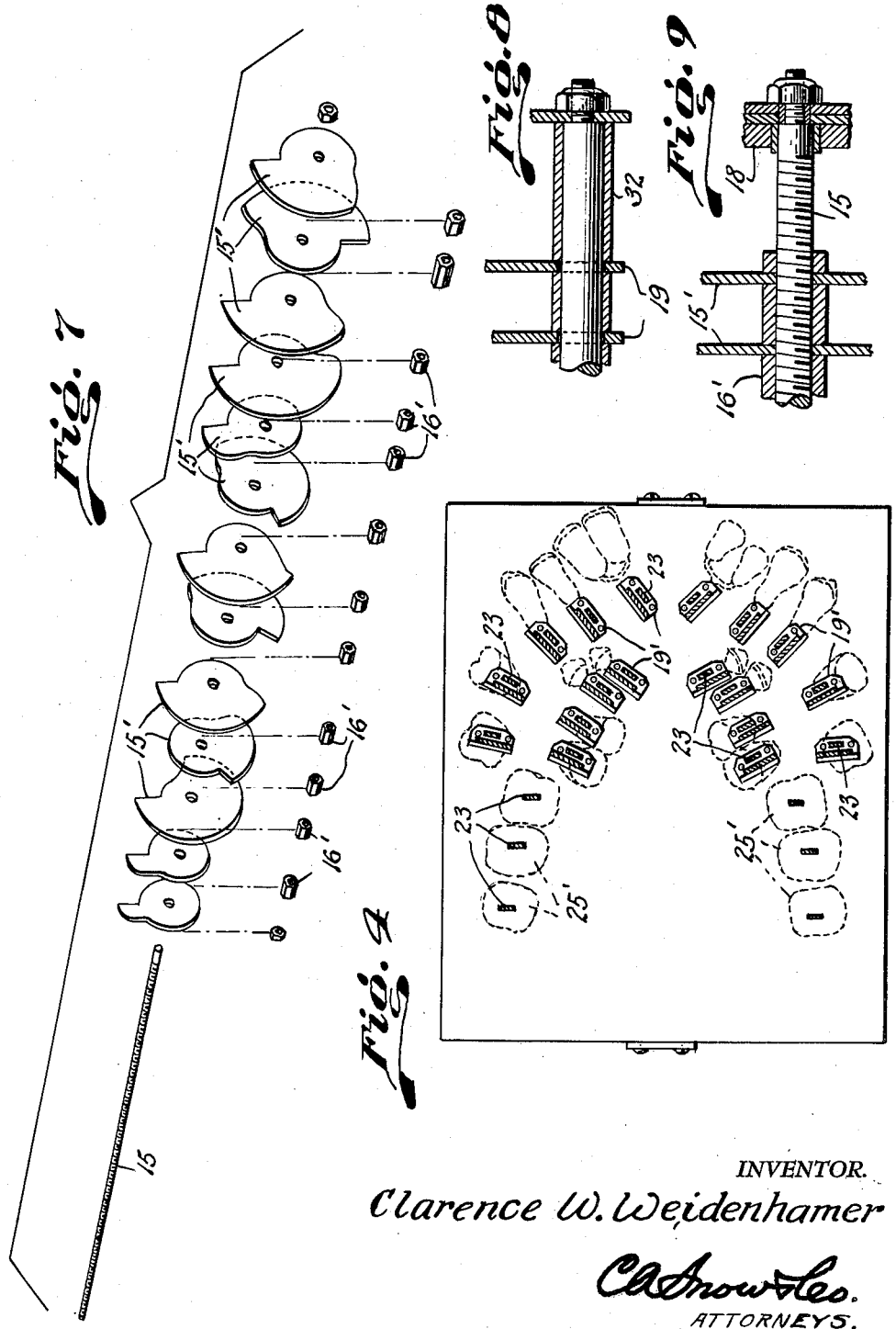

United States Patent Office 2,812,578
Patented Nov. 12, 1957

2,812,578

DENTAL EDUCATIONAL DEVICE

Clarence W. Weidenhamer, Baltimore, Md.

Application December 15, 1955, Serial No. 553,250

5 Claims. (Cl. 32—71)

This invention relates generally to educational apparatus and particularly to an apparatus for progressively showing the growth of teeth in the human mouth, the first appearance of "first" teeth, and their progressive replacement by "second" teeth, in the order in which such appearance and replacement actually occurs in the human mouth from childhood to maturity.

It is an important object of our invention to provide efficient mechanical means for visually conveying the information described above, which is characterized by simplicity and low cost and is readily portable.

Other objects and advantages of our invention will be apparent from a reading of the following description in connection with the drawings, wherein for purposes of illustration we have shown a preferred embodiment of our invention.

In the drawings:

Figure 1 is a perspective view of the device as a whole.

Figure 2 is a vertical sectional view through the device.

Figure 3 is a detailed enlarged vertical section taken longitudinally of the upper jaw mechanism.

Figure 4 is a top plan view of Figure 3, looking down in the direction of the arrows on a line 4—4.

Figure 5 is a horizontal sectional view through Figure 3 approximately on a line 5—5 looking down on the same.

Figure 6 is a transverse vertical sectional view taken through Figure 3 approximately on a line 6—6 and looking toward the right in the direction of the arrows.

Figure 7 is a diagrammatic representation of each of the thirteen cams in the upper jaw assembly.

Figure 8 is a detailed enlarged vertical section taken longitudinally through Figure 3 on a line 8—8 looking in the direction of the arrows and showing cam follower link bearings and spacers.

Figure 9 is a detailed enlarged vertical section taken longitudinally through Figure 3 on a line 9—9 looking in the direction of the arrows and showing method of attaching and spacing cams on threaded cam shaft.

Figure 10 is a transverse vertical sectional view of one set of tooth support assemblies and cam follower, showing in and out positions of teeth.

Figure 11 is a detailed perspective view of one of the tooth supports and its guide.

Referring in detail to the drawings the numeral 1 refers generally to the embodiment of our invention which comprises a hollow casing or cabinet preferably of streamlined design formed of plastic, metal, or any other suitable material. The top of the cabinet is open, the interior of the cabinet being viewed through the front glass window 5'. Below the glass window and normally enclosed thereby are the upper and lower jaw molds 26' which are supported by the top plate 30 of the cabinet of Figure 2 and positioned as shown in Figure 1.

When the control knob 12, shown on the exterior of the cabinet Figure 5, and in detail Fig. 6, is rotated in a clockwise manner, it energizes the interior mechanism. The shaft 13 to which the control knob 12 is attached as shown in Fig. 5, and in detail in Fig. 6, has a worm 6' thereon which is meshed with the large gear 14, which is fixed to the main shaft 15 on which is mounted the upper jaw cam assembly 14'. Motion of rotation of the upper jaw cam shaft 15 is transmitted through a flexible coupling 16 to the main shaft 17 on which the lower jaw cam assembly 17' is mounted. Upper jaw cams are similar to lower jaw cams. Assembly of upper jaw cams Fig. 7 is typical for lower jaw cams Fig. 2. The cams 15' of each of the cam assemblies are locked in their relative relation on the main cam shafts 15 and 17 by threaded spacers 16' as shown in Fig. 7. Opposite ends of upper jaw 15 and lower jaw 17 main cam shafts are supported in bearings 18.

Above each of the cam assemblies is a follower assembly. The follower assembly consists of the cam follower 19, fork 20, springs 21, guide 22 and tooth support 23, better shown in Figures 10 and 11. The upper jaw follower assembly, which is located over the upper jaw cam assembly, is supported by vertically spaced uprights 24 and 25 between which are connected horizontal members 26 and 27 forming a frame, as shown by Figs. 2 and 3. The lower jaw follower assembly which is located over the lower jaw cam assembly is supported by vertically spaced uprights 28 and 29 between which are connected horizontal members 30 and 31 forming a frame shown by Figure 2.

The fact that humans grow two separate sets of teeth in a lifetime is clearly shown by the intervals at which the cams push up the pairs of the first teeth progressively into the upper and lower jaw molds, Figure 1, respectively, then permit these pairs of teeth to fall out progressively, followed by the appearance of the second or permanent set of teeth in pairs in the jaw molds in the order in which they grow in. Thus one revolution of the main shafts 15 and 17, with the cam assemblies takes in the evolution through growth and disappearance of both of the "first" and the "second" or permanent sets of teeth. It is arranged that after the permanent or second set of teeth has been shown to grow in, these teeth all drop out together and the cycle starts over again. Thus, the front pair of baby teeth are first made to appear in the jaw molds followed by the second pair of baby teeth normally making their appearance at the sides of the first front teeth in both the upper and lower jaws, until the first dentition is complete, whereupon all of the teeth of the first dentition drop out of the jaw molds in their proper sequence. The development of the teeth of the second dentition then begins and proceeds in a similar manner.

Since the upper and lower jaw follower assemblies are practically identical the description of the upper assembly Figure 3 will adequately describe both of these assemblies. Each cam follower 19 has a bearing at one end on a rod 32 rigidly attached between the vertically spaced uprights. The other end of the cam follower is attached by pin bearing to a flat vertically disposed portion 20 whose upper end is forked to provide a pair of vertical arms. Attached to each vertical arm by means of a pin bearing is a flat tooth support section 23 which in turn has a rigid pin 17' in one end which engages the curved slot 18' in a guide section 22, which is rigidly attached to the horizontal frame member 19' by means of bracket 20', secured thereto by rivets 21' that extend through openings in said brackets and frame member. The flat vertical parts of the forks slide through vertically aligned openings in the horizontal members 19' of the supporting frames. Circumposed on each vertical arm of the forks and below the top horizontal member is a helical spring 21, Fig. 10. It is obvious that both the cam followers 19 follow the working curve of the cam 15' of the cam assembly associated therewith, by reason of the downward bias of the springs 21 and that upward movement of the follower is accomplished by the upward bias of the cam against the tension of the springs. The teeth 25' are exact reproductions of actual teeth made from any desirable material. Reference to Fig. 7 will disclose the form of the cams of each of the cam assemblies. The lobes of the cams are designated "1st" and "2nd," respectively. In each of the cam assemblies the engagement of the "1st" lobes operates the first dentition followers so as to push the pairs of teeth up into the jaw molds Fig. 1, which are of some suitable pliable material such as sponge rubber or rubber dam material indicated by the reference character 26'. The first dentition of course contains only twenty infant teeth or deciduous teeth. The "2nd" lobes of the cam push up the followers corresponding to the thirty-two permanent or adult teeth, in each instance, in both the upper and lower jaw molds.

Although we have shown and described herein a preferred embodiment of our invention, it is to be definitely understood that we do not desire to limit the application of the invention thereto, and any change or changes may be made in material and structure and arrangements of parts, within the spirit of the invention and the scope of the subjoined claims.

Having described the invention, what is claimed as new is:

1. A device for demonstrating the successive development of human teeth in the jaw, comprising a form simulating the jaw, a plurality of teeth below and registered with the locations in said jaw form in which the corresponding teeth make their first appearance in the human jaw, individual tooth supporting means mounted in said support, cam means for biasing said tooth supporting means upwardly elevating said teeth to their proper relative positions within said form and drive means for said cam means.

2. A device for demonstrating the successive development of teeth in the human jaw, comprising a form thereon simulating the human jaw, a plurality of teeth below and registered with the locations in said jaw form in which the corresponding teeth make their first appearance in the human jaw, individual support means supporting the corresponding teeth, individual cam means for biasing said individual supporting means to positions with the teeth thereof extending into said jaw form in their natural relative positions, drive mechanism for said cam means, said cam means being arranged to be operated by said drive mechanism to permit all of said support means to return to their initial positions and thereby retract all of said teeth from said jaw form simultaneously after all of said teeth have been brought to full maturity positions in said jaw form and spring means arranged to operate the teeth slidably as a low part of the cams are reached, for retracting the teeth from upwardly projected positions.

3. A device for demonstrating the successive development of teeth in the human jaw, comprising a casing having a form thereon simulating the human jaw, a plurality of teeth below and registered with the locations in said jaw form in which the corresponding human teeth make their first appearance, individual support means supporting the corresponding teeth, individual cam mechanism for biasing individual tooth supporting means upwardly locating the teeth thereof in said jaw form in their proper relative positions, drive means for said cam mechanism, said jaw form being composed of flexible material adapted to be engaged by said teeth in arriving in and leaving positions on said jaw form, spring means arranged to operate the teeth slidably as a low part of the cams are reached, for retracting the teeth from upwardly projected positions.

4. A device for demonstrating the successive development of teeth in the human jaw, comprising a casing embodying a form simulating the human jaw, groups of artificial teeth mounted within said casing under said form, mechanism including arms and cams for gradually moving said groups of teeth successively into said form exposing said teeth above said form simulating the development of teeth in the human jaw.

5. A device for demonstrating the successive development and growth of teeth in the human jaw, comprising a casing embodying a form simulating the human jaw, said form having tooth openings, groups of artificial teeth representing the first and second sets of human teeth, mounted under said form for movement into said openings, and mechanism for successively moving the groups of teeth into said form exposing the teeth above said form.

References Cited in the file of this patent

UNITED STATES PATENTS 961,262    Slough _____ June 14, 1910